United States Patent
Schulman

(10) Patent No.: US 10,699,610 B2
(45) Date of Patent: Jun. 30, 2020

(54) FRAMED POSTER BOARD THAT REFLECTS AND REFRACTS LIGHT AS COLOR HUES

(71) Applicant: Royal Consumer Products LLC, Norwalk, CT (US)

(72) Inventor: Steven A. Schulman, Norwalk, CT (US)

(73) Assignee: Royal Consumer Products LLC, Norwalk, CT (US)

( * ) Notice: Subject to any disclaimer, the term of this patent is extended or adjusted under 35 U.S.C. 154(b) by 0 days.

(21) Appl. No.: 16/534,482

(22) Filed: Aug. 7, 2019

(65) Prior Publication Data

US 2020/0082743 A1 Mar. 12, 2020

Related U.S. Application Data

(63) Continuation-in-part of application No. 29/678,717, filed on Jan. 30, 2019, and a continuation-in-part of application No. 29/697,270, filed on Jul. 6, 2019, now Pat. No. Des. 875,176.

(60) Provisional application No. 62/728,213, filed on Sep. 7, 2018.

(51) Int. Cl.
*A47G 1/06* (2006.01)
*G09F 19/14* (2006.01)
*G03H 1/00* (2006.01)
*G09F 15/02* (2006.01)

(52) U.S. Cl.
CPC .......... *G09F 19/14* (2013.01); *A47G 1/0627* (2013.01); *G03H 1/0005* (2013.01); *G09F 15/02* (2013.01); *G03H 2001/0055* (2013.01)

(58) Field of Classification Search
CPC .............................. A47G 1/0627; B32B 7/023
USPC ................................... 40/798, 768, 616, 800
See application file for complete search history.

(56) References Cited

U.S. PATENT DOCUMENTS

| | | | | | |
|---|---|---|---|---|---|
| 2,055,570 | A | * | 9/1936 | Bradley | B44C 5/02 156/214 |
| 3,687,770 | A | * | 8/1972 | Chase | B42F 5/00 156/221 |
| 4,170,836 | A | * | 10/1979 | Seufert | A47G 1/06 40/773 |
| 6,165,592 | A | * | 12/2000 | Berger | B42D 25/29 250/486.1 |
| 7,290,803 | B2 | * | 11/2007 | Scarbrough | B41M 3/148 283/109 |
| 2002/0003635 | A1 | * | 1/2002 | Boswell | B32B 38/06 359/1 |
| 2004/0112962 | A1 | * | 6/2004 | Farrall | G06K 7/12 235/462.01 |
| 2006/0019074 | A1 | * | 1/2006 | Scarbrough | B41M 1/18 428/195.1 |

\* cited by examiner

*Primary Examiner* — Joanne Silbermann
(74) *Attorney, Agent, or Firm* — Robert J. Hess; Hess Patent Law Firm

(57) ABSTRACT

A poster board whose central region is thicker than its peripheral region. The peripheral region having a reflective and refractive surface that provides iridescent color hues within a rainbow spectrum. The reflective and refractive surface may contain a holographic pattern of geometric shapes of different sizes and shapes. The reflective and refractive surface may give rise to spaced apart bands with each of the bands containing the rainbow spectrum of color hues.

14 Claims, 20 Drawing Sheets
(20 of 20 Drawing Sheet(s) Filed in Color)

FRAMED POSTER BOARD THAT REFLECTS AND REFRACTS LIGHT AS COLOR HUES

CROSS-REFERENCE TO RELATED APPLICATIONS

The present application is a continuation-in-part patent application from design patent application Ser. No. 29/678,717 filed Jan. 30, 2019 and a continuation-in-part of design patent application Ser. No. 29/697,270 filed Jul. 6, 2019 and claims the benefit of invention priority from provisional patent application No. 62/728,213 filed Sep. 7, 2018.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable

BACKGROUND OF THE INVENTION (1) Field of the Invention

The present invention relates to a poster board that is framed by a holographic design that has surfaces that refract light into color hues.

(2) Description of Related Art Including Information Disclosed Under 37 CFR 1.97 and 1.98

BRIEF SUMMARY OF THE INVENTION

A poster board whose central region is thicker than its peripheral region. The peripheral region having a reflective and refractive surface that provides iridescent color hues within a rainbow spectrum. The reflective and refractive surface may contain a holographic pattern of geometric shapes of different sizes and shapes. The reflective and refractive surface may give rise to spaced apart bands with each of the bands containing the rainbow spectrum of color hues.

For a better understanding of the present invention, reference is made to the following description and accompanying drawings, while the scope of the invention is set forth in the appended claims.

BRIEF DESCRIPTION OF THE SEVERAL VIEWS OF THE DRAWING(S)

The patent or application file contains at least one drawing executed in color. Copies of this patent with color drawings will be provided by the Office upon request and payment of the necessary fee.

DETAILED DESCRIPTION OF THE INVENTION

Figure 1:
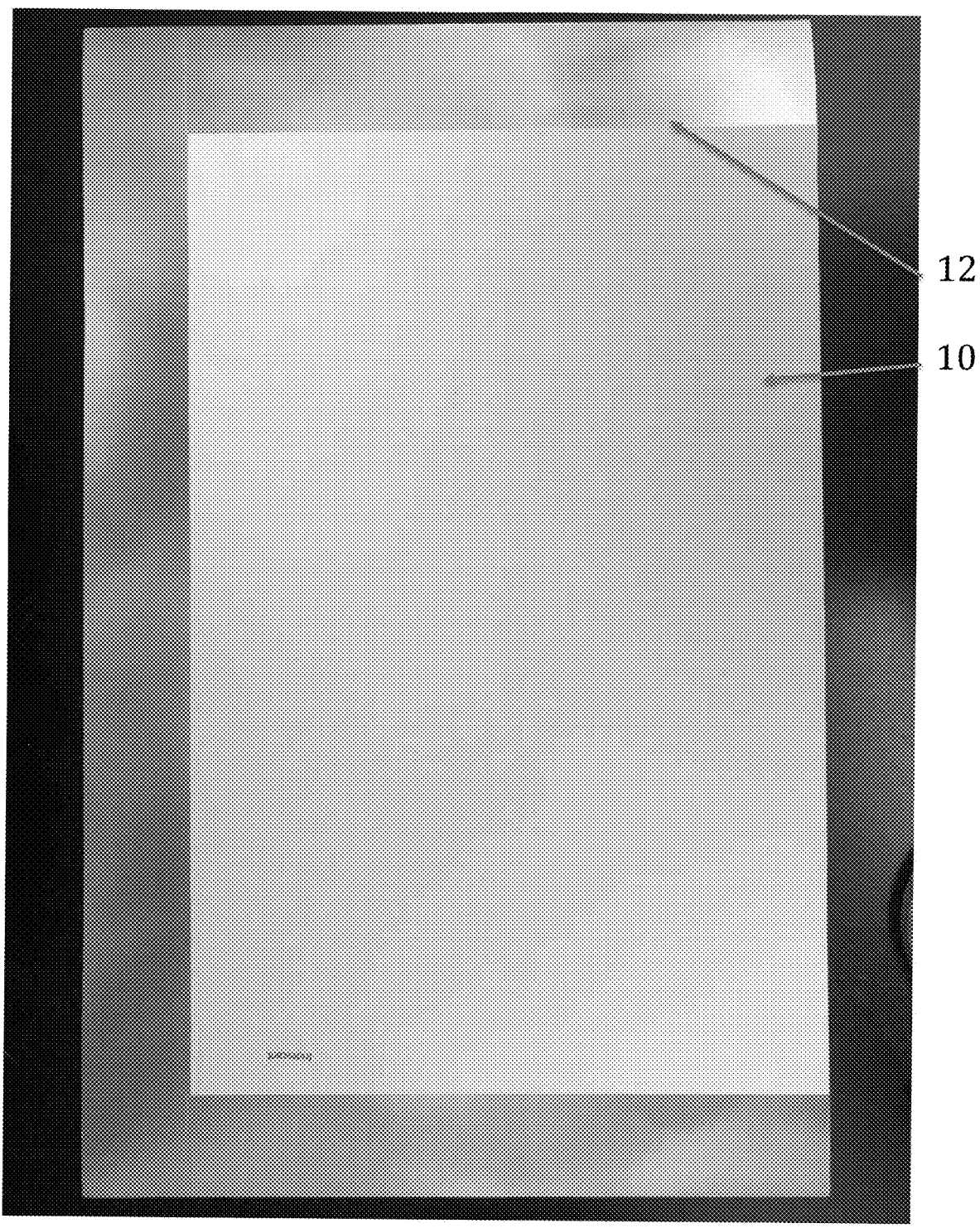
FIG. 1 is a top view of one half of a framed poster board in accordance with a iridescent frame embodiment of the invention.
Figure 2:
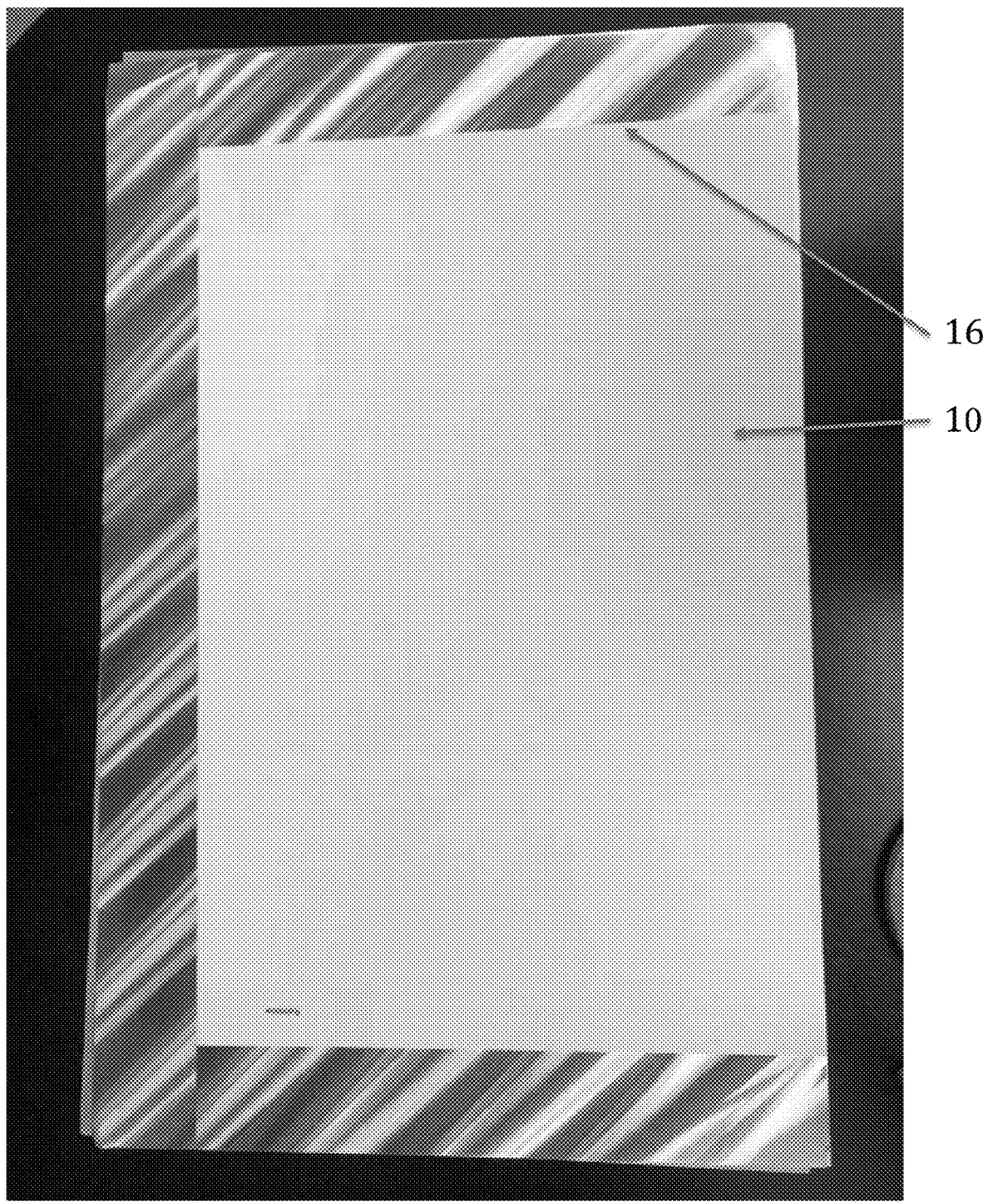
FIG. 2 is a top view of one half of a framed poster board in accordance with a multi-rainbow band frame embodiment of the invention.
Figure 3:
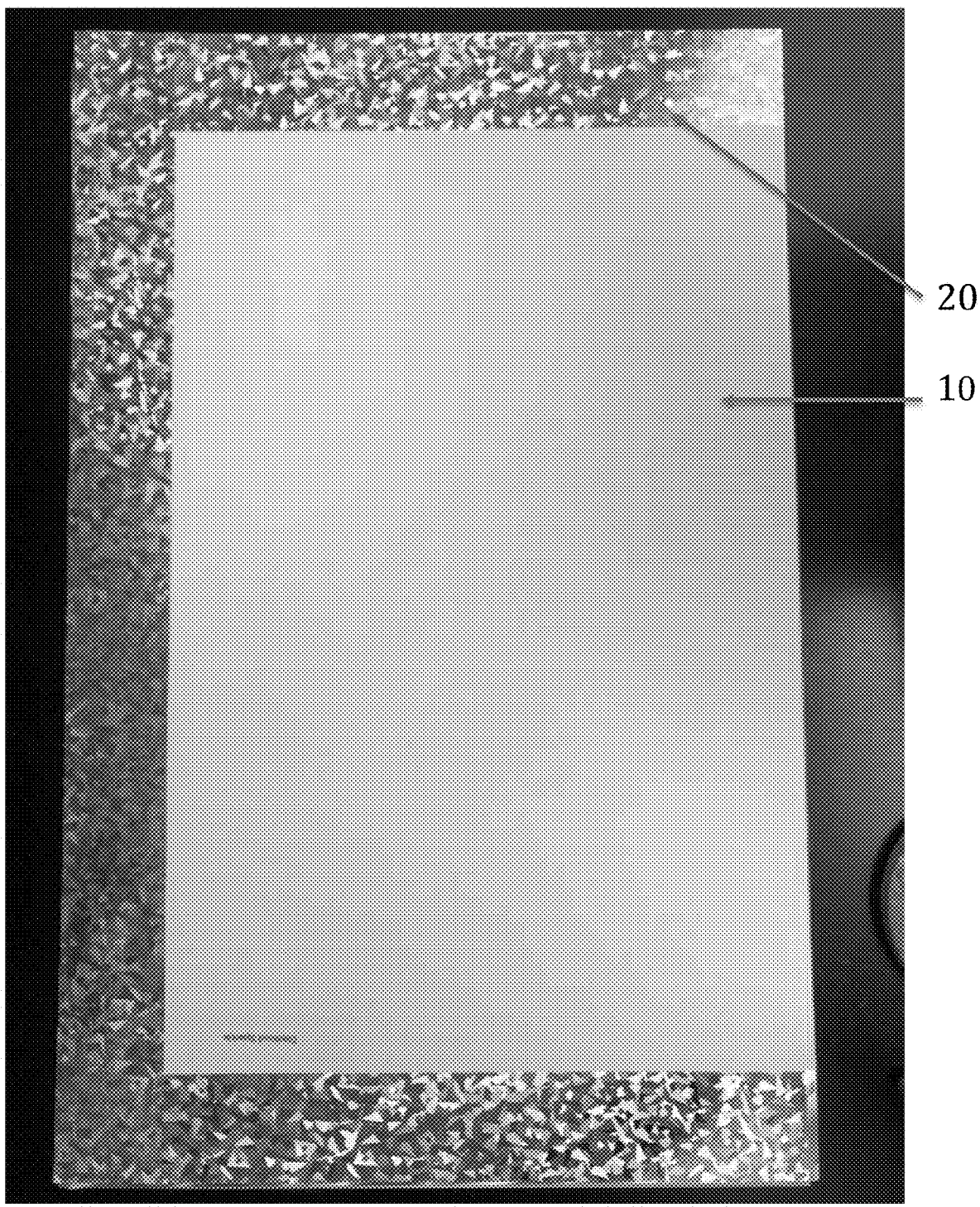
FIG. 3 is a top view of one half of a framed poster board in accordance with a holographic frame embodiment of the invention.
Figure 13:
FIG. 13 is an angled view of the top side of a portion of the framed poster board of FIG. 3.

Turning to the drawings, FIGS. 1-3 are halves of three different framed poster boards 10, 12, 14. Turning to FIG. 13, a peripheral region 16 of conventional poster board is underneath a holographic foil 18, which together gives an appearance of a rectangular frame about a central region 20 of the poster board. The periphery of the central region 20 has an edge 22 that illuminates from the light that reflects and refracts off the holographic foil 18 and that impinges the edge 22.

The process for forming the framed poster board involves applying a conventional holographic foil to a peripheral region of a conventional poster board and using a hot stamping process to enable the holographic foil to accept a pattern from a laser engraved die made of polyethylene terephthalate material.

As a consequence, the central region 20 of the poster board, which is left intact, appears to be slightly raised relative to the frame 18, because the thickness of the frame 18 is smaller than the thickness of the central region 20 of the poster board. As a consequence, there are edges 22 about the periphery of the central region 20 that are visible neighboring the frame 18. When light shines on the frame to refract and reflect off in the direction to the edges, portions of the edges 22 become illuminated from the color hues of the refracted and reflected light. Such illumination is exemplified by FIG. 10 of the holographic framed poster board of design application Ser. No. 29/678,718, whose contents are incorporated herein by reference.

FIG. 1 is indicative of half of an iridescent framed poster board having a central region 10 and having a frame surface 12, which reflects and refracts light to provide iridescent color hues whose shapes appear to change depending upon the angle at which the iridescent color hues are viewed.

FIG. 2 is indicative of that from half of the rainbow, iridescent, framed poster board of design patent application Ser. No. 29/697,270 having a central region 14 and having a frame surface 16, which reflects and refracts light to provide inclined bands of color hues.

FIG. 3 is indicative of that from half of the holographic framed poster board of design application Ser. No. 29/678, 718 having a central region 18 and having a frame surface 20, which reflects and refracts light to provide a mixture of color hues.

The contents of design patent application Ser. No. 29/678, 718 and design patent application Ser. No. 29/697,270 are incorporated herein by reference in their entireties. The former pertains to a holographic framed poster board and the latter pertains to a rainbow, iridescent, framed poster board. The poster board of each is of conventional construction. A respective frame 12, 16, 20 (FIGS. 1-3) is applied to the peripheral region of the poster board and, as a result, the peripheral portion of the poster board that lies underneath compresses such that an overall thickness of the peripheral region, which includes both the compressed peripheral region of the applicable poster board and the associated frame 12, 16, 20, together are thinner than the respective central region 10, 14, 18 of the poster board that remained in its uncompressed state.

The holographic frame of the holographic framed poster board of design application Ser. No. 29/678,718 has light reflective and refractive polygon-shaped surfaces that reflect and refract light into a pattern of color hues that change when viewed from different angles. Neighboring ones of the reflective, polygon-shaped surfaces differ from each other with respect to their orientation and size. The central region of the poster board has edges protruding upright that can be illuminated from direct impact of the reflected color hues that reflect off the reflective, refractive polygon-shaped surfaces and that are directed toward the edges. The polygon-shaped surfaces contain patterns of parallel lines that are visible. The parallel lines are indicative of stacked refractive layers that refract white light that impinges upon them into different color hues.

Figure 4:
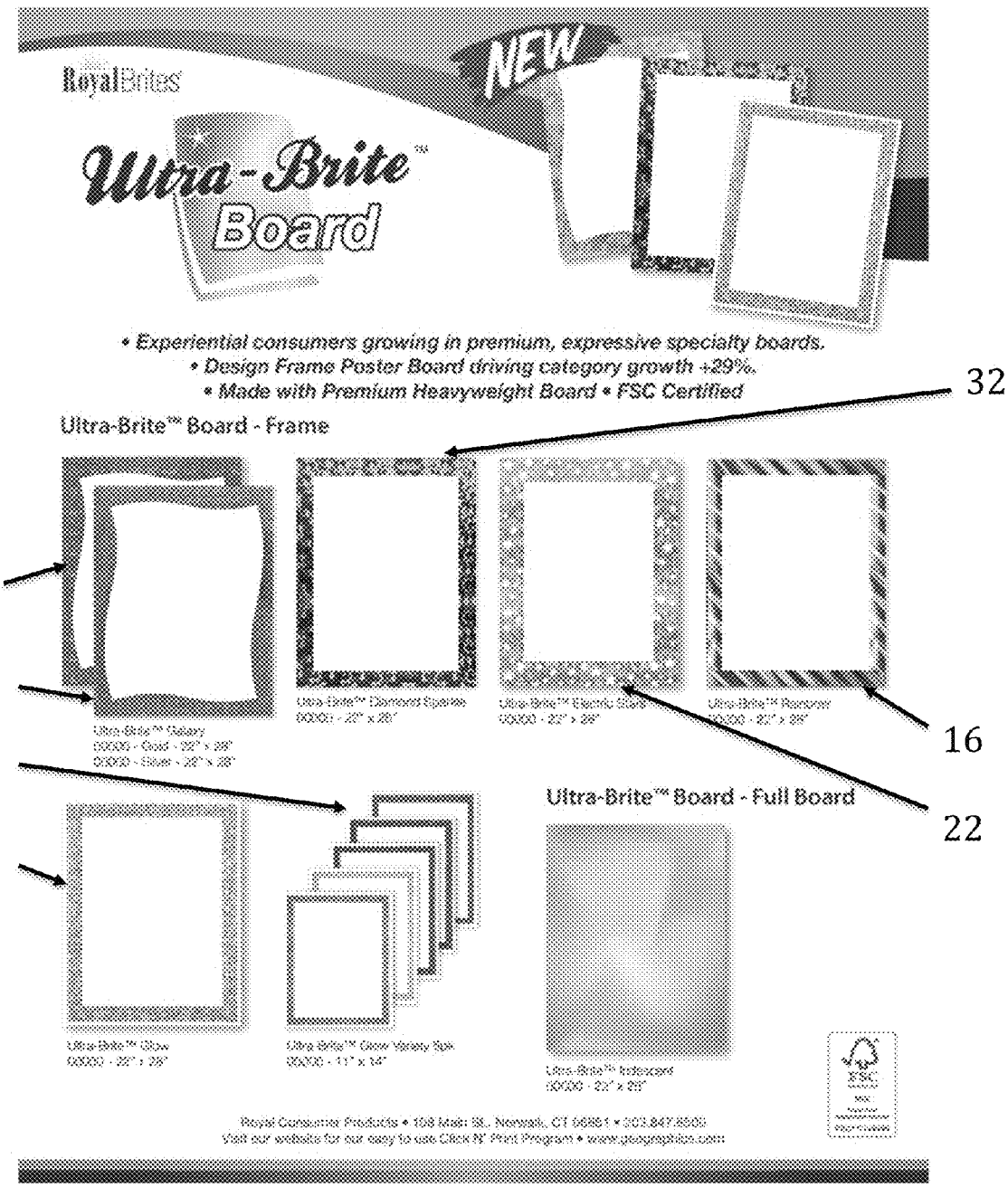
FIG. 4 is a online screen shot depicting an advertisement of a plurality of whole framed poster boards in accordance with further embodiments of the invention.
Figure 5:
FIG. 5 is an angled view of the topside of a corner portion of the iridescent frame embodiment of FIG. 2 with sunlight shining upon the frame.
Figure 6:
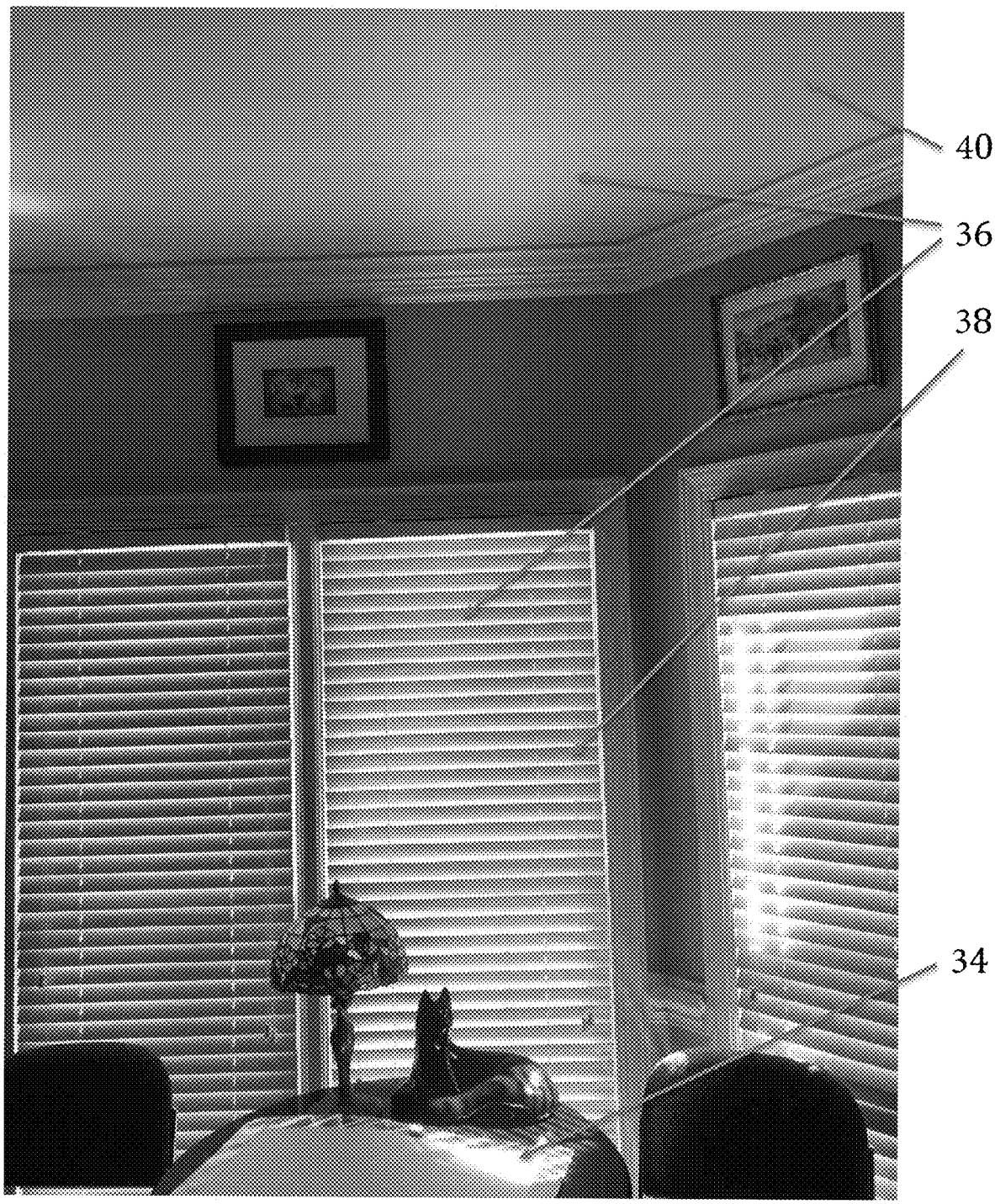
FIG. 6 is a photograph depicting a room containing the iridescent frame poster board of FIG. 5 lying horizontal with sunlight reflecting and refracting off to give rise to a rainbow spectrum of color hues one window shades and the ceiling.
Figure 7:
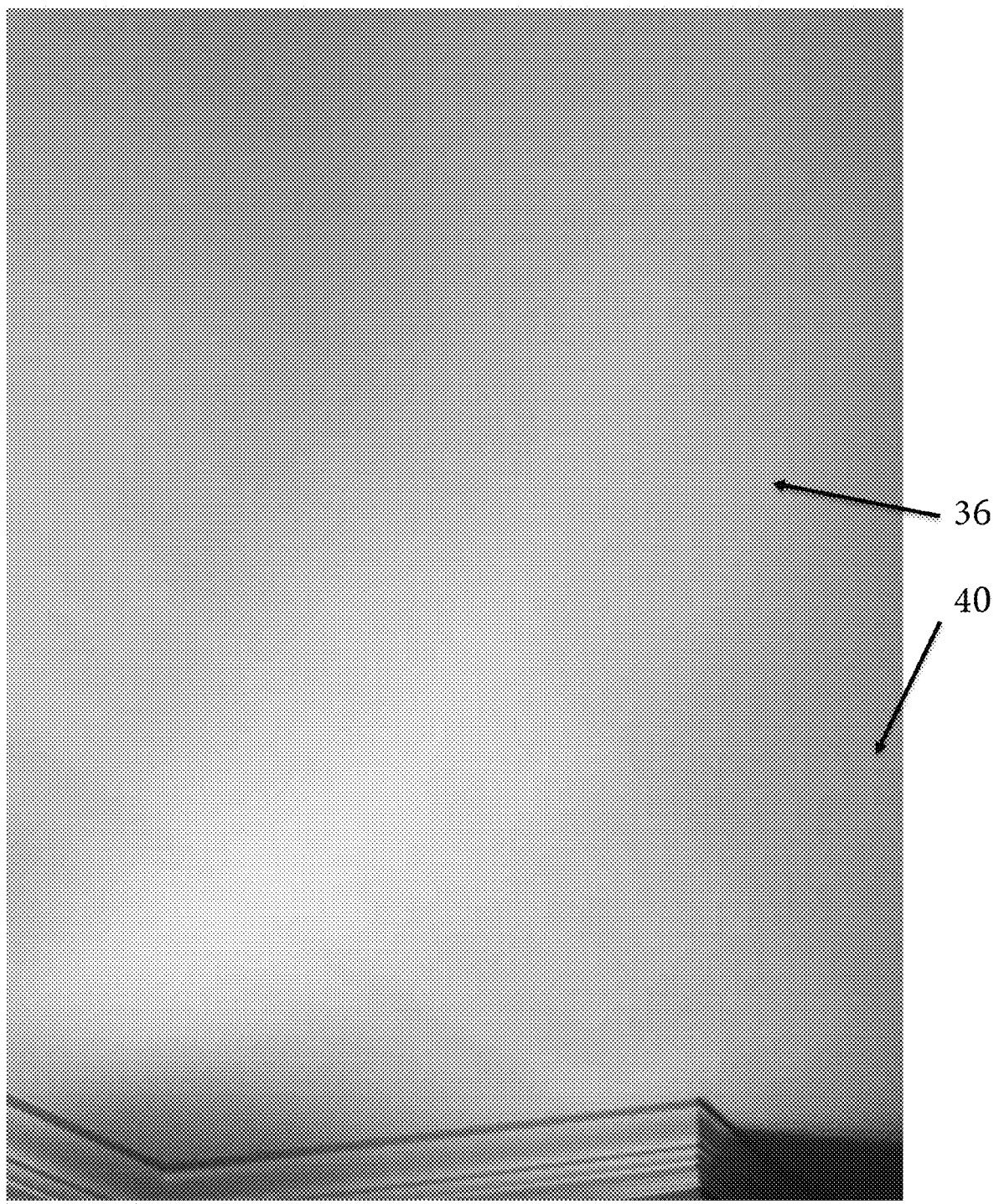
FIG. 7 is a photograph of the ceiling in FIG. 6 to show the rainbow spectrum of color hues close up.

Indeed, turning to FIG. 4 herein, a variety of framed poster boards are depicted. Their frames 16, 22, 24, 26, 28, 30, 32 reflect and refract light striking their surfaces to provide a rainbow color hue effect. For instance, in FIG. 5, intense sunlight shines through a window to strike the corner region 24 of a framed poster board of U.S. design patent application Ser. No. 29/697,270 and FIG. 2 of the present application. The sunlight is reflected and refracted to provide a rainbow of color hues 26 on surrounding room surfaces as illustrated in FIG. 6 (see window blinds 28 and ceiling 30) and in FIG. 7 (ceiling 30).

The frames 12, 16, 20 of FIGS. 1-4 are supplied by a supplier, namely, Yiwu DengHui Import and Export Co., LTD NO.41 DongzhouYingriyuan, Yiwu, Zhejiang, China 322000. An exemplary product name for one of the frames is item #24443 Silver Holographic Boarder Poster Board 22"×28.

The criteria for the frame manufacture was to (A) provide the reflective and refractive surfaces on the borders instead of the whole sheet so that the frame visually stands out and to (B) provide the reflective and refractive effect iridescent to provide various changing colors (in the rainbow spectrum) from reflections.

To achieve (A), the supplier used Hot Stamping process instead of the regular lamination which gives the border of the paper board more pressure during the hot stamping process so that it looks like the frame visually standing out.

Figure 8:
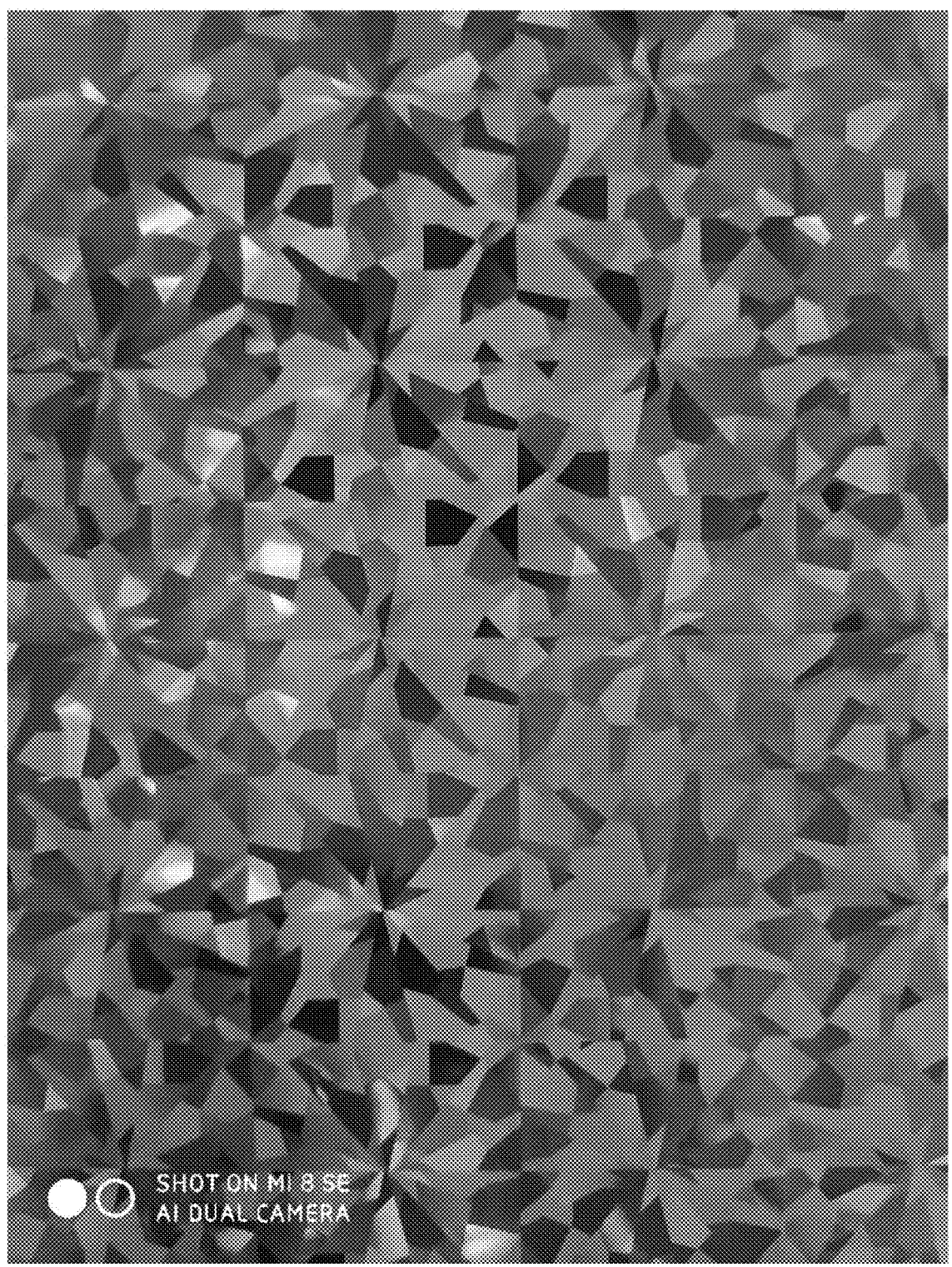
FIG. 8 is a top view of a plurality of standard multiple square holographic designs in accordance with a first holographic embodiment.
Figure 9:
FIG. 9 is a top view of a single continuous holographic design of the first holographic embodiment of FIG. 8.
Figure 10:
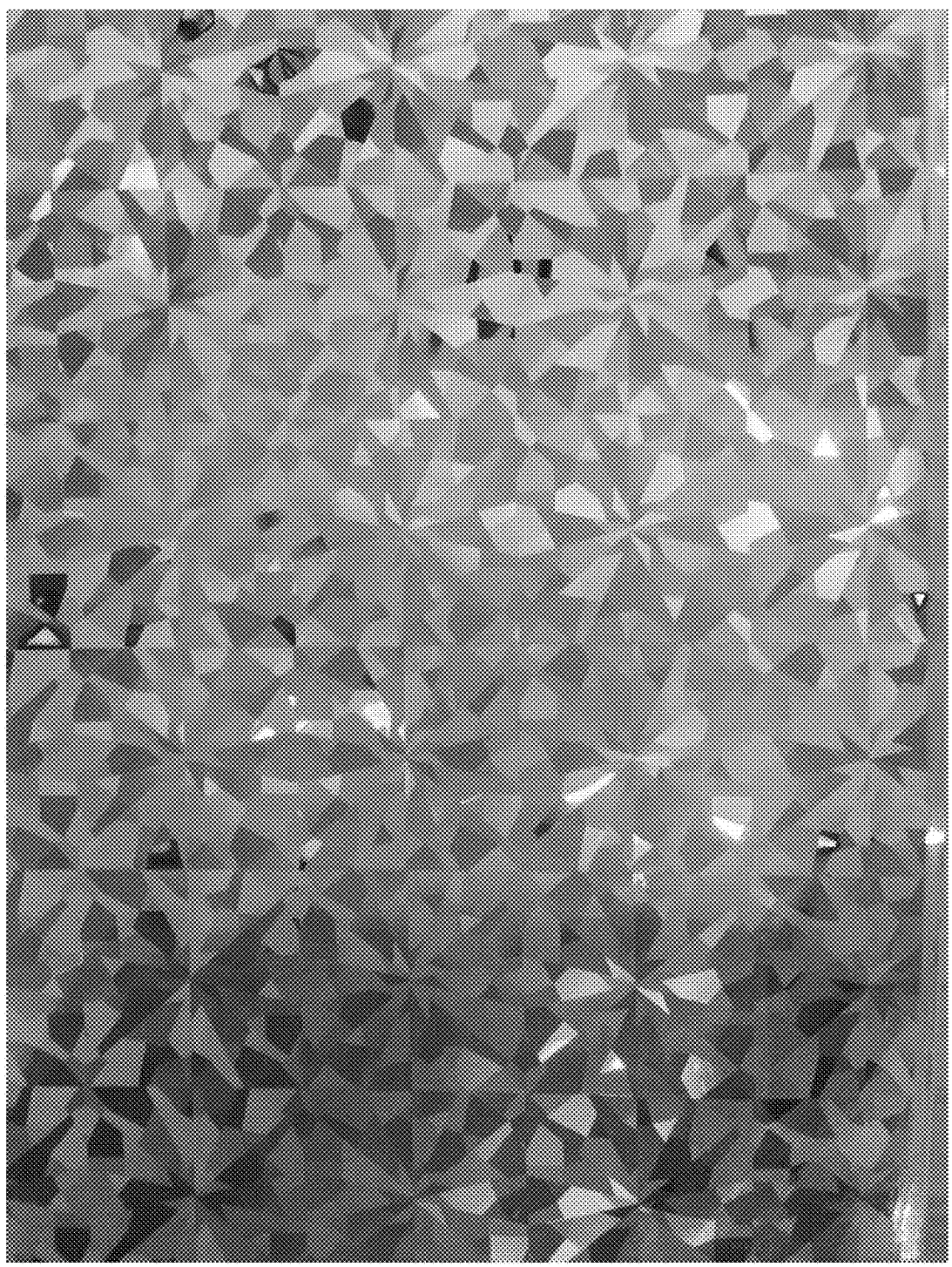
FIG. 10 is a top view of a plurality of standard multiple square holographic designs in accordance with a second holographic embodiment.
Figure 11:
FIG. 11 is a top view of a single continuous holographic design of the second holographic embodiment of FIG. 10.
Figure 12:
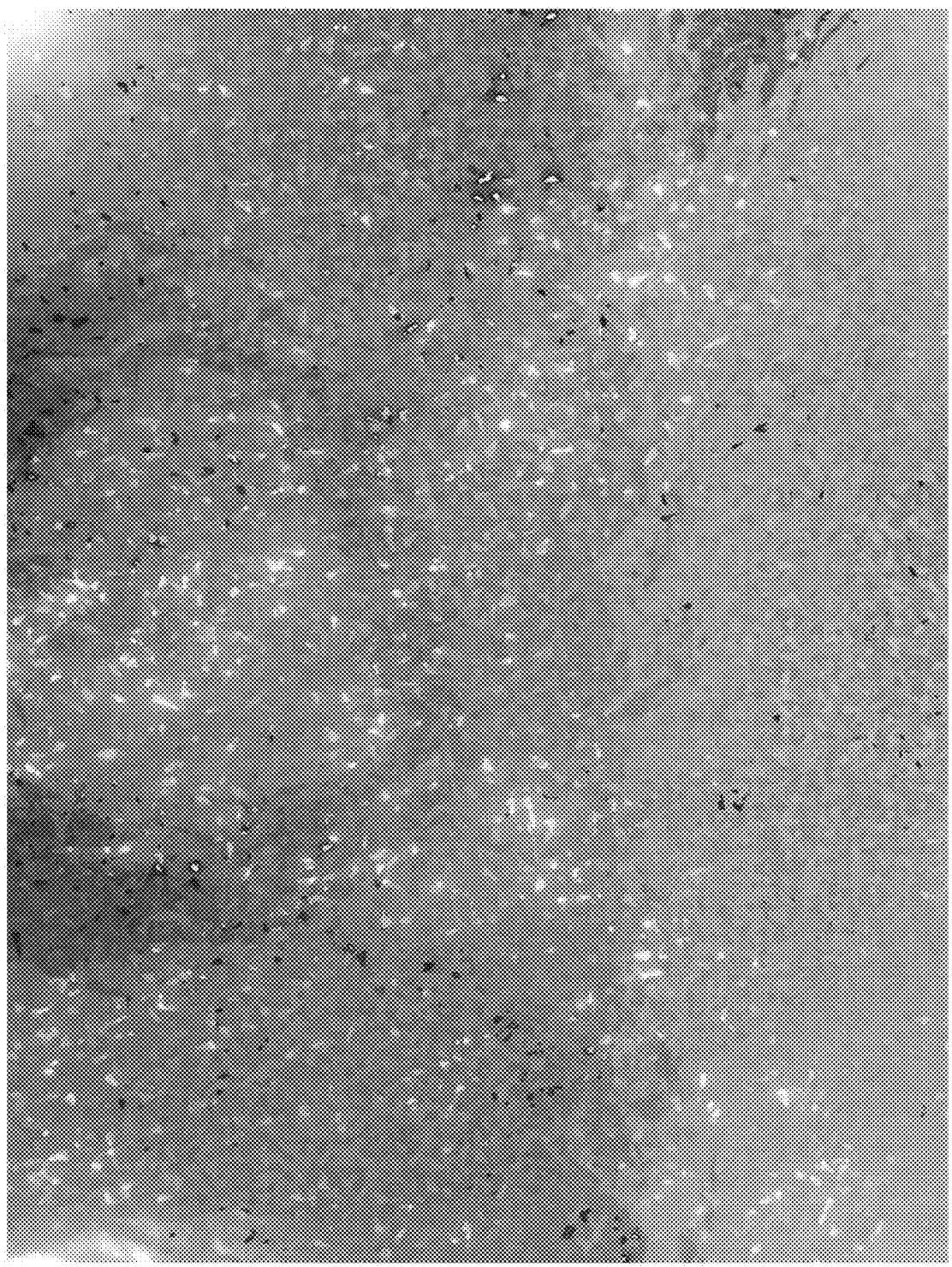
FIG. 12 is a top view of a single continuous holographic design of a third holographic embodiment.

To achieve (B), the supplier modified their hot stamping die and machine, to make one large continuous holographic design (FIGS. 9, 11, 12) instead of the standard multiple 2.8"×2.8" square holographic designs (FIGS. 8, 10). To make the reflection and refraction effect work properly, the holographic needs to be more reflective and has iridescent affects. The layout of multiple small squares of the old die (FIGS. 8, 10) blocks the light reflection. For the new die (FIGS. 9, 11, 12), with the layout of one big piece square instead of the multiple squares, it makes the light more reflective and has iridescent affect as the products need to be.

Figure 14:
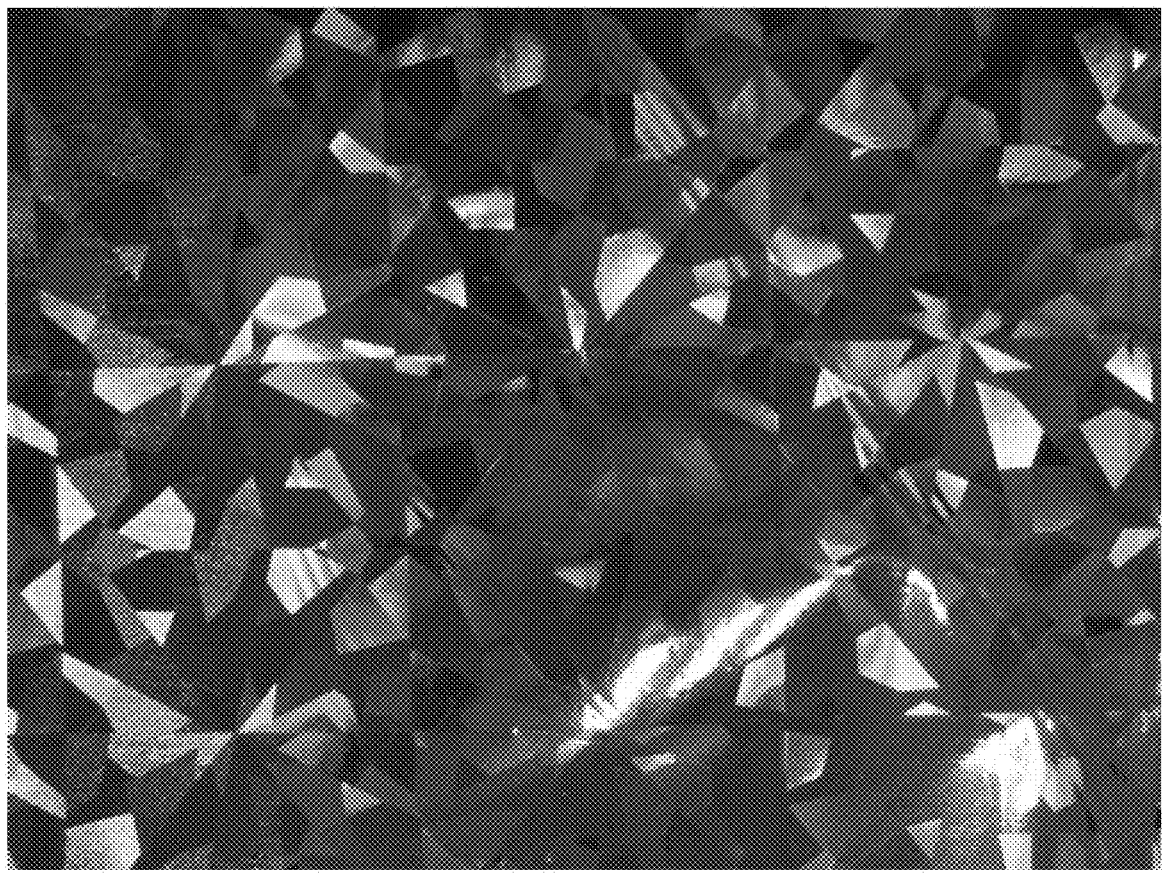
FIG. 14 is a top view of standard multiple square holographic designs with the edges of the squares present.

The one large continuous holographic design sheet is cut appropriate to the configuration of a frame (FIG. 13). As shown in FIG. 14, the edges of the squares that form the square holographic designs remain visible but are not seen in the continuous holographic of FIG. 13.

The equipment used in the manufacture of the frames with their reflective and refractive surfaces is a laser engraving machine having the following technical parameters:

| TECHNICAL PARAMETERS | |
| --- | --- |
| MODLE | SF3015G |
| PROCESSING AREA | 3000 mm × 1500 mm |
| LASER POWER | 500 W-3000 W |
| VELOCITY | 120 m/min |
| ACCURACY | ±0.03 mm/m |

Such equipment is used by JINHUA SHUDA STATIONERY PRINTING CO.,LTD of China.

Figure 15:
FIG. 15 is a front view of a laser engraved die on a roller of a machine to apply the pattern of the laser engraved die to holographic foil.
Figure 16:
FIG. 16 is an angled view of the machine of FIG. 15 with the laser engraved die in position.
Figure 17:
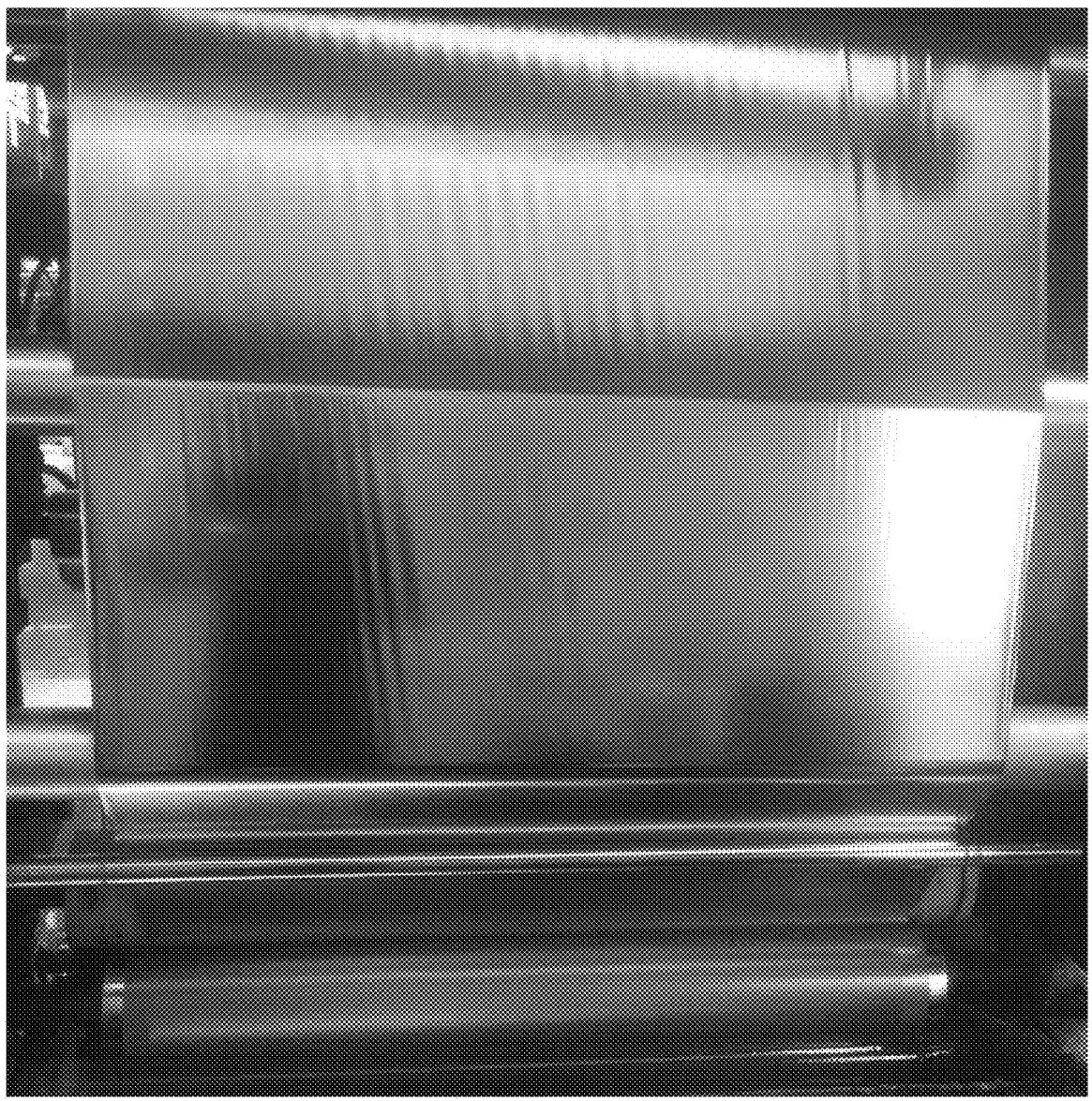
FIG. 17 is a plan view of a plurality of rollers operative in the machine of FIG. 15 to move holographic foil to receive the pattern of the laser engraved die.
Figure 18:
FIG. 18 is an isometric view showing the manner that the holographic foil is moved by rollers.

FIGS. 15-18 show the manner of applying the pattern from a laser engraved die to holographic foil material used as the frame for the poster board. FIGS. 15 and 16 show a full sheet die in position on a roller. FIGS. 17 and 18 show holographic foil to which the pattern from the laser engraved die is to be applied.

Figure 19:
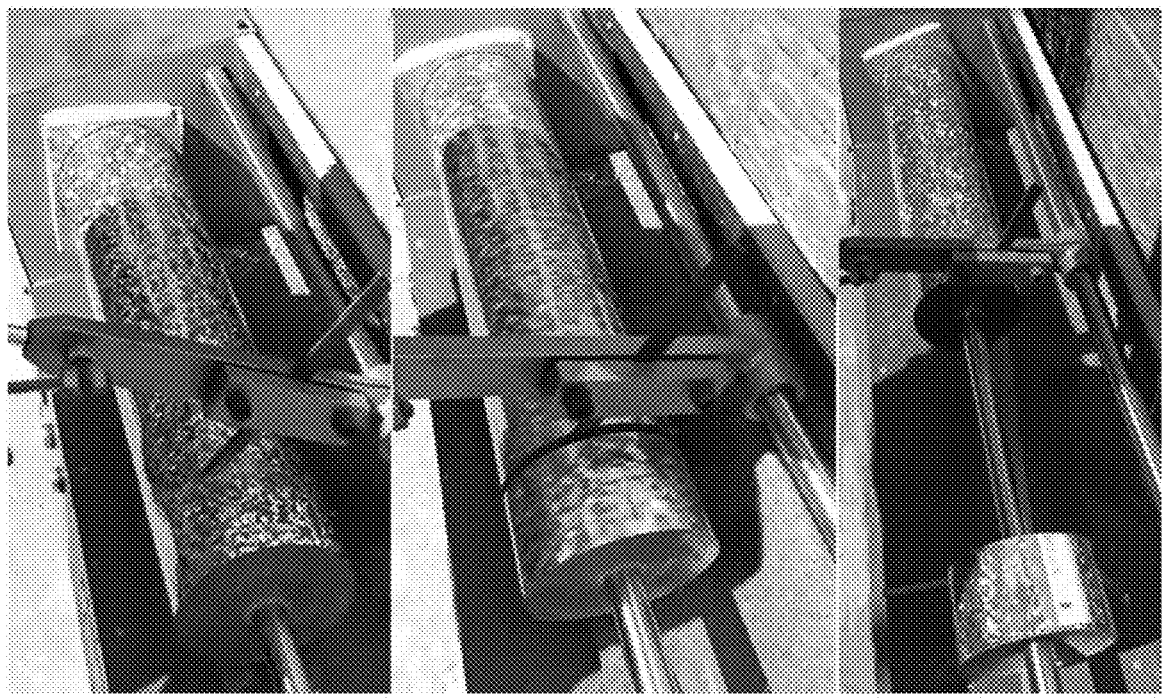
FIG. 19 shows progressive views of a conventional die cutting device performing a cutting operation of a holographic sheet.

FIG. 19 shows a die cutting operation to form the frame of the framed poster board of the invention.

Figure 20:
FIG. 20 shows progressive view of a conventional hot press device applying heat and pressure.

FIG. 20 shows a hot press operation to apply heat and pressure. Such is used to apply the die pattern to the holographic foil, which in turn is applied to the periphery of a poster board.

While the foregoing description and drawings represent the preferred embodiments of the present invention, it will be understood that various changes and modifications may be made without departing from the scope of the present invention.

What is claimed is:

1. A framed poster board whose frame attracts attention, comprising:
   a poster board defining a layer in common having an uncompressed central region and a compressed peripheral region, the uncompressed central region having a thickness greater than a thickness of the compressed peripheral region, and
   a holographic foil on the compressed peripheral region and having a pattern and being reflective and refractive to light so that light reflects off and refracts into color hues of different colors, the holographic foil surrounding the uncompressed central region of the poster board so that the holographic foil provides a visual appearance of a frame,
   wherein the uncompressed central region has a periphery that defines an edge arranged to be impinged by the reflected and refracted light from the holographic foil and thus become illuminated with the color hues of different colors.

2. The framed poster board of claim 1, wherein the frame has a surface having a plurality of different geometric shapes in stacked layers that refract the light into the color hues of different colors.

3. The framed poster board of claim 1, wherein the frame has a surface upon which appears bands of the color hues, the bands being spaced apart from each other and being arranged to incline and align accordingly with counterparts separated by the central region of the framed poster board.

4. The framed poster board of claim 3, wherein each of the bands has a respective spectrum of different color hues arranged one after another as in a rainbow color spectrum.

5. The framed poster board of claim 1, wherein the frame has a surface that provides shapes of iridescent color hues within a rainbow spectrum and the shapes appear to change depending upon the angle at which the iridescent color hues are viewed.

6. The framed poster board of claim 1, wherein the uncompressed central region is thicker than a combination of a thickness of the compressed peripheral region and a thickness of the holographic foil.

7. The framed poster board of claim 1, wherein the uncompressed central region lacks the holographic foil.

8. A framed poster board whose frame attracts attention, comprising:
   a poster board defining a layer in common having a compressed portion and an uncompressed portion, the uncompressed portion being thicker than the compressed portion, the uncompressed portion constituting a central region and the compressed portion constituting a peripheral region, wherein the peripheral region further includes a holographic foil on the compressed portion, the holographic foil having a pattern and is reflective and refractive to light so that light reflects off and refracts into color hues of different colors, the holographic foil surrounding the central region of the poster board so that the holographic foil provides a visual appearance of a frame, wherein the central region has a periphery that defines an edge arranged to be impinged by the reflected and refracted light from the holographic foil and thus become illuminated with the color hues of different colors.

9. The framed poster board of claim 8, wherein the frame has a surface having a plurality of different geometric shapes in stacked layers that refract the light into the color hues of different colors.

10. The framed poster board of claim 8, wherein the frame has a surface upon which appears bands of the color hues, the bands being spaced apart from each other and being arranged to incline and align accordingly with counterparts separated by the central region of the framed poster board.

11. The framed poster board of claim 10, wherein each of the bands has a respective spectrum of different color hues arranged one after another as in a rainbow color spectrum.

12. The framed poster board of claim 8, wherein the frame has a surface that provides shapes of iridescent color hues within a rainbow spectrum and the shapes appear to change depending upon the angle at which the iridescent color hues are viewed.

13. The framed poster board of claim 8, wherein the central region is thicker than a combination of a thickness of the compressed portion and a thickness of the holographic foil.

14. The framed poster board of claim 8, wherein the central region lacks the holographic foil.

* * * * *